(12) United States Patent
Aleksandrov

(10) Patent No.: US 12,008,544 B2
(45) Date of Patent: Jun. 11, 2024

(54) METHOD FOR PERFORMING A CONTACTLESS PAYMENT TRANSACTION

(71) Applicant: Vadim Nikolaevich Aleksandrov, Moscow (RU)

(72) Inventor: Vadim Nikolaevich Aleksandrov, Moscow (RU)

(*) Notice: Subject to any disclaimer, the term of this patent is extended or adjusted under 35 U.S.C. 154(b) by 0 days.

(21) Appl. No.: 17/656,433

(22) Filed: Mar. 25, 2022

(65) Prior Publication Data

US 2022/0270075 A1 Aug. 25, 2022

Related U.S. Application Data

(63) Continuation of application No. 16/317,571, filed on Jan. 14, 2019, now abandoned.

(51) Int. Cl.
  G06Q 20/40 (2012.01)
  G06Q 20/20 (2012.01)
  G06Q 20/32 (2012.01)
  H04L 9/06 (2006.01)

(52) U.S. Cl.
  CPC ....... *G06Q 20/3278* (2013.01); *G06Q 20/202* (2013.01); *G06Q 20/40145* (2013.01); *H04L 9/0643* (2013.01)

(58) Field of Classification Search
  None
  See application file for complete search history.

(56) References Cited

U.S. PATENT DOCUMENTS

| | | | |
|---|---|---|---|
| 2012/0158515 A1* | 6/2012 | K. | G06Q 30/0269 705/14.66 |
| 2017/0080346 A1 | 3/2017 | Abbas | |
| 2017/0163655 A1* | 6/2017 | Ramalingam | H04W 48/04 |
| 2017/0221055 A1* | 8/2017 | Carlsson | G06Q 20/40 |
| 2017/0323299 A1 | 11/2017 | Davis | |
| 2018/0158042 A1* | 6/2018 | Finch | G06Q 20/204 |
| 2018/0232817 A1* | 8/2018 | Isaacson | G06F 3/048 |

FOREIGN PATENT DOCUMENTS

| | | | | |
|---|---|---|---|---|
| EA | 2013012158 A1 | 5/2015 | | |
| EP | 3 108 397 B1 * | 3/2019 | | G06F 21/30 |
| WO | WO-2017099314 A1 * | 6/2017 | | G06F 21/30 |
| WO | 2017218567 A1 | 12/2017 | | |

* cited by examiner

*Primary Examiner* — Joseph W. King

(57) ABSTRACT

The present invention relates to the technical field of electronic payment transactions and biometric identification therewithin. In the general aspect, the invention may be directed to a method for performing a contactless payment transaction using a remote access to a user device via a cloud computer server ("hands free" or "touchless" operations) that will ensure achieving the technical result consisting in providing privacy and security when transmitting user's biometric data, in particular an image of a user's face, for the purpose of identifying him/her for performing the payment transaction.

5 Claims, 3 Drawing Sheets

METHOD FOR PERFORMING A CONTACTLESS PAYMENT TRANSACTION

CROSS-REFERENCE TO RELATED APPLICATION

This application is a continuation of U.S. patent application Ser. No. 16/317,571, which is the National Stage of International Application No. PCT/RU2018/000487, filed on Jul. 23, 2018.

TECHNICAL FIELD

The invention relates to methods for performing an electronic contactless payment transaction using near-field and/or remote communication technologies in which user identification is performed by recognizing a user face image and/or iris image and/or scanning his/her fingerprint and/or through NFC tap of user authenticated device, wherein user identification and payment data are stored in a user device in a specially digitized protected form, and these data cannot be used in the case of the unauthorized access to the device.

BACKGROUND OF THE INVENTION

At present, payment transactions are mainly carried out in one step. A buyer uses a payment card or cash to purchase goods and services after scanning of the goods and calculating of the purchase amount have been completed. The buyer has to wait until scanning of his/her goods is done, which slows down the process of performing the payment transaction, and also causes various inconveniences for the buyer. Accordingly, there is a need to speed up the way a payment transaction is performed and to improve the convenience of performing such transactions for a buyer.

A system, a method and an apparatus for performing identification by facial recognition and transactions in a store are known (US Patent Application No. 2017323299, published Nov. 9, 2017). In particular, the payment system allows a user to perform an in-store payment transaction in favor of a merchant when purchasing goods or services at a place of registration in a store. For example, one or more implementations include receiving a payment request for initiating a payment transaction between the user and the merchant in the store, the payment request including a user image. In one or more embodiments, the payment system identifies a payment account of a user based on his/her image and sends a payment confirmation request to the user device. In one or more embodiments, the payment transaction is processed in the store based on a confirmation response received from the user device. In this system, the merchant device can send a captured user image to a server device for user identification. The server device can send payment transaction data to the merchant device after identifying the user and determining the payment account.

Technical Problem

The disadvantages of the described solution may include insufficient security of a payment transaction, since the implementation of the described method does not provide acceptable confidentiality of a user, since the merchant device can send the captured user image to the server device for user identification without converting the specified data in order to ensure the user's privacy and security of the payment transaction.

The Solution of the Problem

The object of the invention is to provide a method for performing a contactless payment transaction using a near-field communication (NFC) technology and/or a remote access technology to a user device via a cloud computer server ("hands free" or "touchless" operations) that will ensure achieving the technical result consisting in providing privacy and security when transmitting user biometric data, in particular an image of a user's face, for the purpose of identifying him/her, continuing the payment transaction, accelerating the payment transaction, as well as increasing the user convenience.

The above-mentioned object is achieved by providing a method for performing a contactless payment transaction, the method including:
  registering a user in a system enabled for contactless payment transactions;
  performing a payment transaction wherein the following steps are performed:
  identifying the user by obtaining and further processing his/her biometric data and payment data;
  starting a payment transaction;
  scanning the codes of goods and/or services being purchased;
  performing cash register transactions;
  completing the payment transaction; and
  processing the data on the purchase completed;
  wherein the step of identifying the user includes transforming his/her biometric and payment data into a set of digital data.

Digital data (a digital avatar) are (is) a unique set of data that cannot be transformed back into biometric data (for example, a face image of a user).

A user is registered by registering a payment application provided with a near-field communication technology (NFC) or a remote access technology on the user device. The remote access technology is, for example, a WiFi network, BLE (bluetooth low energy), or 4G on the user device.

A face image, an iris image, and a fingerprint of a user are used as the user biometric data.

According to a preferred embodiment of the present invention, the biometric and payment data are transformed by using a hash function (SHA-2) and adding unique data generated by a server based on a secret key into an identifier for performing a payment transaction.

When being registered in the system enabled for contactless payment transactions, the user may select or create an image with a name to represent the user in the system.

Advantageously, the user is pre-identified by displaying the image with the name he/she has selected on a display of a device that belongs to the system enabled for contactless payment transactions and participates in the payment transaction, provided that the user device is detected in close proximity to the device that belongs to the system enabled for contactless payment transactions and participates in the payment transaction.

An image with a name selected by a user (a visual avatar) is simply a picture or a virtual image with a name that the user has selected or created beforehand and is able to distinguish from others when interacting with the system enabled for contactless payment transactions.

The user may be identified and the payment transaction may be started simultaneously with scanning the codes of goods being purchased.

The step of performing a payment transaction further includes performing a loyalty operation.

Preferably, the user is informed of his/her purchases, goods and discounts.

The user is further informed about his/her purchases, goods and discounts, and the identification of the user, the start of the payment transaction, the cash transactions, the performance of the loyalty operation, the completion of the payment transaction, the processing of the data on the completed purchase, and the informing of the user about his/her purchases, goods and discounts are carried out through a cloud computer server.

When the present invention is implemented, the confidentiality is ensured by the fact that the system enabled for contactless payment transactions does not store or transmit the received image of a user face or other biometric data, and these data are transformed into a set of impersonal unique digital data that cannot be transformed back to obtain the original biometric data to identify the user or use the data to commit unauthorized transactions, and only then the user being the buyer is identified.

The present invention also allows a payment transaction to be speeded up, since identifying a user and obtaining his/her consent to perform a purchase and the means of payment (a bank card, cash, etc.) to pay for the said purchase occur in advance while the codes of the goods being purchased are being scanned. This also allows the user to keep his/her hands free when the payment transaction is completed, which allows him/her to collect his/her purchases without hurrying.

This summary of the invention is intended to explain in a simple way the idea of the invention which is further described below in the detailed description of the invention. This summary of the invention is not aimed to define the essential features of the claimed subject matters of the invention and is also not aimed to be used for limiting the scope of the invention.

BRIEF DESCRIPTION OF THE DRAWINGS

The present invention will be explained in more detail with reference to the following drawings.

DESCRIPTION OF THE EMBODIMENTS

Figure 1:
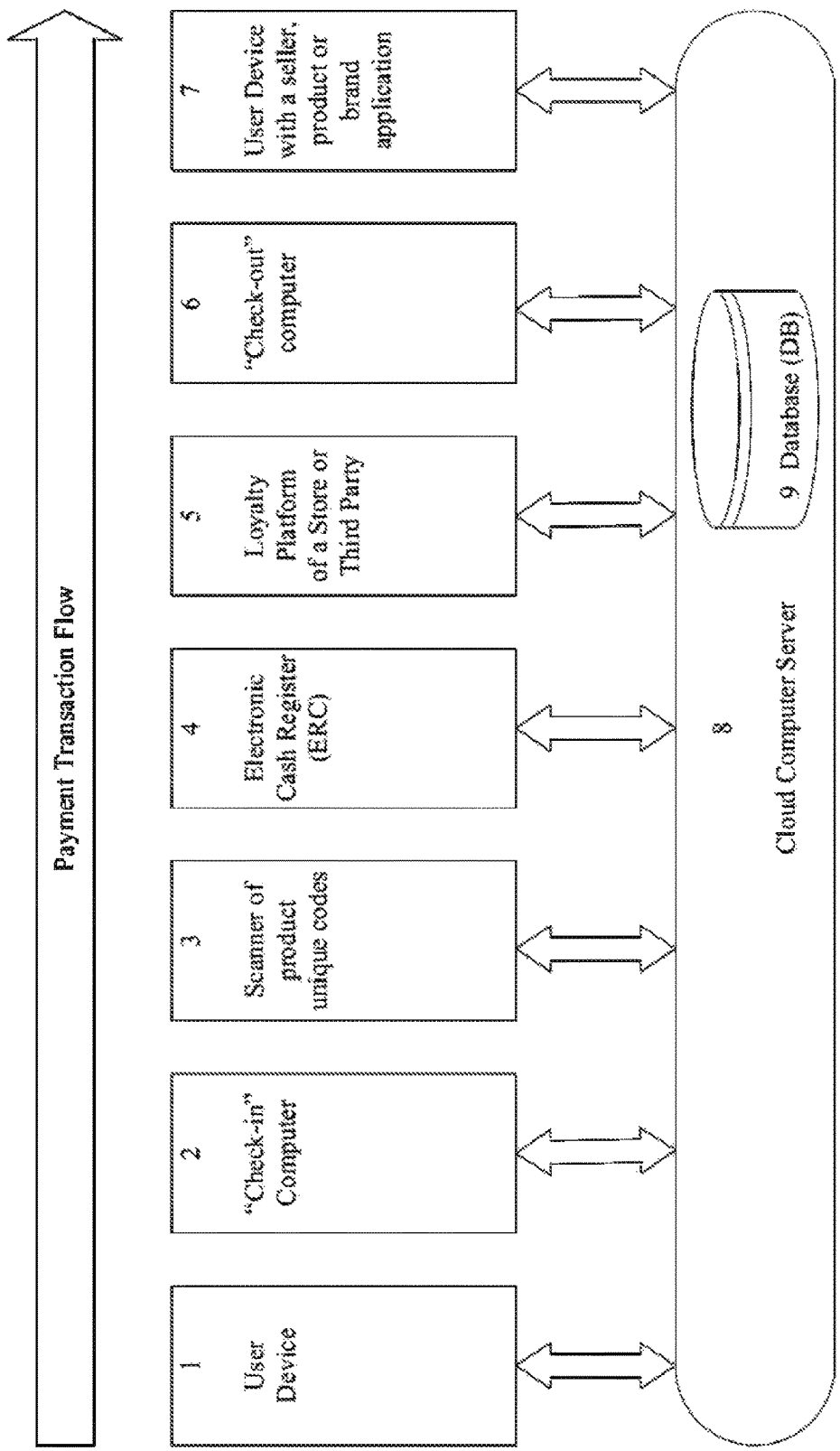
FIG. 1—a schematic diagram of a system for implementing a method for performing a contactless payment transaction.

FIG. 1 shows a user device 1, a "check in" computer 2, a scanner 3 of product unique codes, a cash register 4, a loyalty platform 5 of a store or a third party, a "check out" computer 6, a user device 7 with a product or brand application, a cloud computer server (a cloud server, a cloud) 8, a database 9.

The user device 1 (a mobile device such as a smartphone or any other type of a computing device) is optionally equipped with an NFC technology and comprises a payment application based on a payment token or a payment card contained in the memory of the device 1, and dynamic data that are generated during a transaction. Furthermore, the device 1 can authenticate a user through checking a password, as well as biometric data such as a user face image, an iris image, a fingerprint.

The payment token or a token is an alternative number that is used instead of a payment card number in the digital device 1, such as a smartphone, for performing a payment transaction via an NFC interface or an online transaction through the Internet.

The "check in" computer 2 is used for starting the process of a payment transaction, a loyalty operation, and a payment transaction. It is advantageously located in the close proximity of a payment transaction site where it is performed, that is, next to the cash register 4, where the user is able to start operations according to the claimed method, while the interaction with the previous user is still in progress, but is already coming to the end.

The scanner 3 of product unique codes is used for reading codes (barcodes, Laetus codes) on a package. In the payment transaction site, product codes are read using the scanner 3 of product unique codes. Each product code is associated with a product code in the database 9 of the cloud computer server 8, which allows keeping record of each unit of the product purchased by the user in this store. The scanner 3 of product unique codes can be connected to the cloud computer server 8 directly or through the cash register 4, but the data on the product code, the user, the user device 1 and the store are logically aggregated in the database 9 of the cloud computer server 8 to be subsequently communicated to the product or brand application on the user device 1.

The cash register 4 (an electronic cash register, ECR) or a fiscal computer registers goods being purchased, calculates the final purchase amount and is characterized by the ability to directly or indirectly interact through the cloud computer server 8 with the scanner 3 of product unique codes, the "check out" computer 6 and the loyalty platform 5 of the store or a third party. The cash register 4 is equipped with a fiscal memory, a display, a keyboard, and interfaces for communicating with other online devices via the Internet or through other wired or wireless networks.

The loyalty platform 5 of the store or a third party stores user loyalty card numbers and allows accessing to user accounts on the loyalty platform 5 during a payment transaction, in particular in the course of a payment transaction when the product codes are scanned and the amount for an individual product or the total amount is calculated, the cash register 4 or the scanner 3 of product unique codes send a request to the loyalty platform 5 of the store or a third party directly or through the cloud computer server 8. The request is made for a discount on a product or an amount, or accumulation of bonuses. Thereafter, the purchase amount is changed taking into account the discount and the user receives information about the accumulated bonuses or special offers from the store or the product manufacturer.

The "check out" computer 6 is a conventional payment terminal (POS terminal), that is a device with a keyboard, a display, possibly a camera and communication interfaces in a store, for example it can be implemented as a tablet computer. The task of the "check out" computer 6 is to get payment data (a payment card or a payment token) from the cash register 4 directly or through the cloud computer server 8, to show, if possible, the visual avatar of the user on the display, to show the amount and the code name of the user, and to get his/her consent to the purchase. The user can simply click on the visual avatar, the OK key, put a finger to the fingerprint reader, or look at the camera of the "check in" computer 2. In the latter case, if the user authentication has not been made before or the payment data have not been received, it is possible to establish communication between the device 1 and the user payment application and to obtain the missing data. If the operation is unsuccessful, the user always can pay using traditional methods—a bank card or cash. After receiving the payment data (the payment token or the payment card), the payment terminal sends a request to the payment network of the store to perform the payment transaction.

The user device 7 with a product or brand (merchant, 3$^{rd}$ party) application installed receives the aggregated data on the purchases of this product, which allows the manufacturer to provide the user with special offers for this product via email, via the product or brand application on the user device 1, or via post. The product or brand application receives from the cloud computer server 8 the detailed information about this product: the place it was bought, the quantity, the statistics on purchases for different periods of time and the loyalty offers from the manufacturer, brand or merchant of the product, based on the user or the specific product purchased by him/her.

The cloud computer server 8 provides interaction between the solution components. The cloud computer server 8 can be distributed, that is, some computers are in the store, and the rest operate remotely. The interaction between the components of the system may also be performed not directly through the cloud computer server 8, but through other system components, yet a logical connection exists between all the components of the system via the cloud computer server 8, although there may be no physical connection between said elements. The cloud computer server 8 also has a data base 9 storing all data on products, users, user devices 1, stores, cash registers 4, loyalty card numbers, payment tokens (after applying the SHA-256 hash function with the addition of the unique data received by means of the server private keys), and other service and functional information.

The data base 9 is a part of the cloud computer server 8 and is used for storing the following data and using this data for performing transactions: the correspondences between the loyalty card numbers and the identifiers obtained after applying the SHA-256 hash function to the payment token with the added unique data generated by means of the server private keys. This will allow using the payment token to perform a loyalty operation with the user loyalty card number, the identifiers of the user, his/her devices 1, the payment application on the user device 1, the store, the cash register 4, the codes of the goods being purchased and the amounts, which allows collecting the data on the goods the user buys, the places, regularity and amounts of purchases, for further communicating these data to the store applications, the product and brand applications, which will allow providing the user with offers for a particular user and/or a product, and/or a manufacturer, and/or a store.

Figure 2:
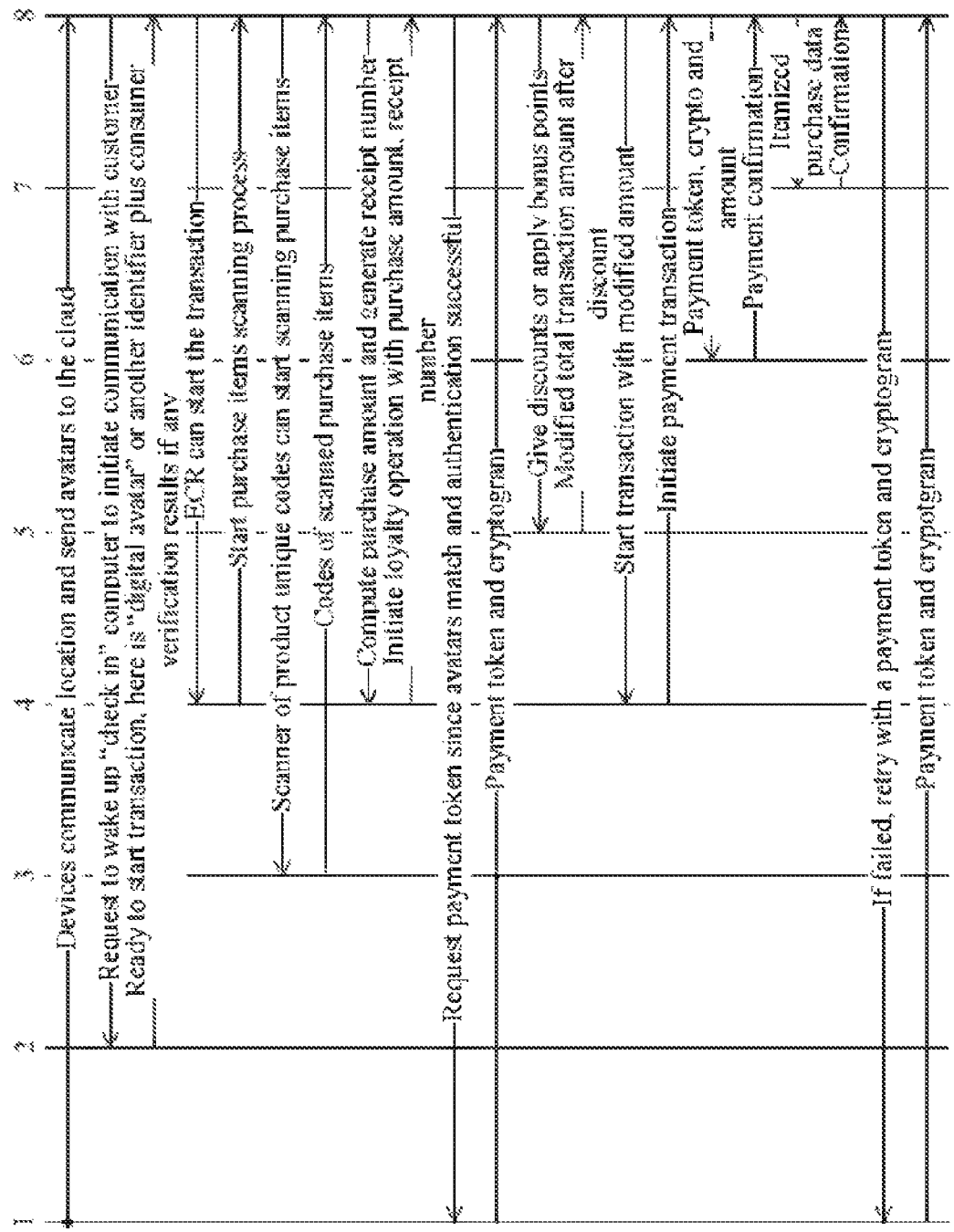
FIG. 2—a diagram of component interactions and solution flows (Solution Flow Diagram)

FIG. 2 is a diagram of component interactions, shown in FIG. 1, and solution flows.

Figure 3:
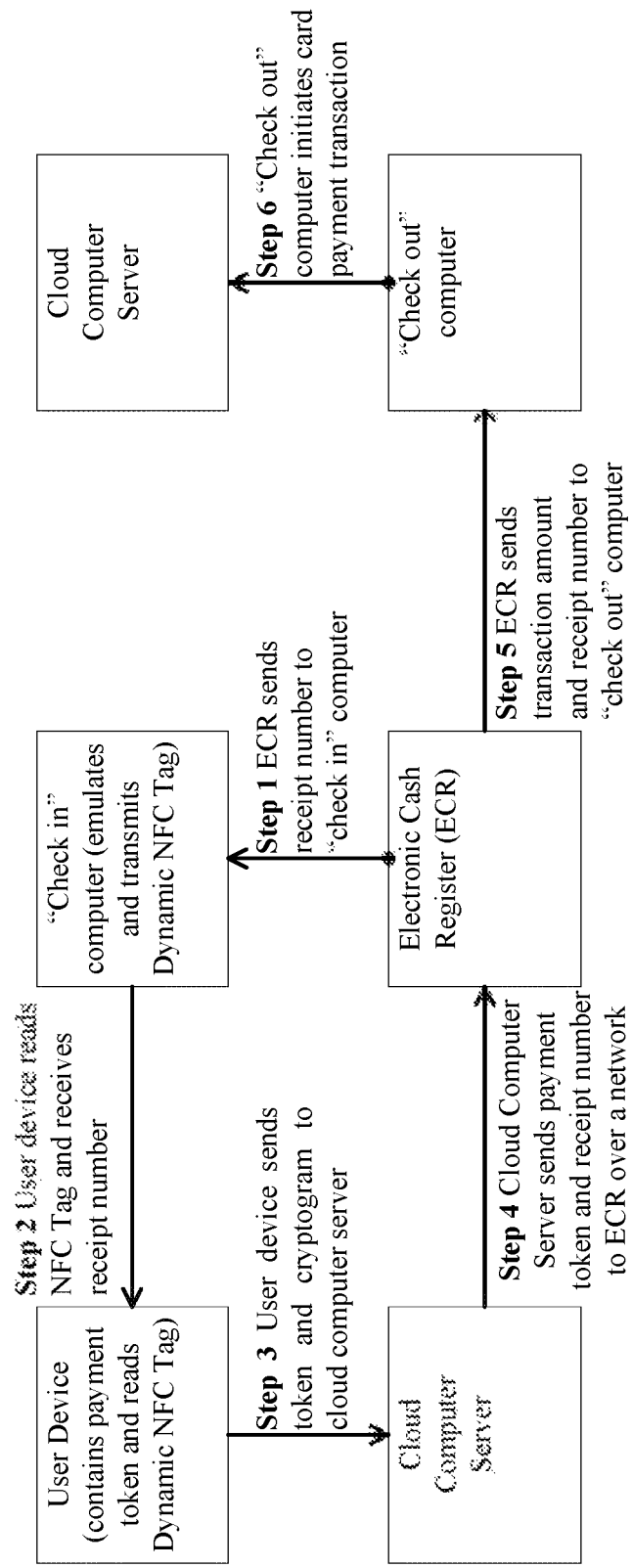
FIG. 3—a block diagram of an exemplary embodiment of a method for performing a contactless payment transaction with NFC tag according to one of the preferred embodiments of the present invention.

FIG. 3 shows the steps of: 1) transmitting by the cash register 4 a receipt number to the "check in" computer 2; 2) reading by the user device 1 the NFC Tag and receiving the receipt number from "check in" computer 2; 3) sending by the user device 1 the payment token and the cryptogram to the cloud computer server 8; 4) sending by the cloud computer server 8 the payment token and the receipt number to the cash register 4 via the Internet; 5) sending by the cash register 4 the receipt number and the payment transaction amount to the "check out" computer 6; and 6) initiating by the "check out" computer 6 the payment transaction via the cloud computer server 8 or directly with the store's payment server.

An exemplary embodiment of the method for performing a contactless payment transaction is discussed in detail below with reference to the respective figures.

A user is registered in advance in a system enabled for contactless payment transactions by registering a payment application on a user device 1 optionally equipped with a Near Field Communication (NFC) technology, and then a payment transaction is carried out involving the steps described below.

Step 1—Identifying a User.

At the first step, the preparation for a payment transaction takes place. The payment application on the user device 1, for example on a smartphone, sends the data on the location of the user device 1 to the cloud computer server 8 if the user device 1 is in close proximity to the device that belongs to the system enabled for contactless payment transactions and participates in the payment transaction, in particular to the cash register 4, the "check in" computer 2, and the "check out" computer 6, i.e. in close proximity to the payment transaction site. The geographic location of the device 1 is determined by standard methods that are supported by the devices with GPS, Wi-Fi, and Bluetooth. The cloud computer server 8 collects information from all the payment applications registered on the user devices 1 in the purchase queue. If the cloud computer server 8 determines that the user device 1 is close enough to the payment transaction site, such as ECR, the cloud computer server 8 sends the user device 1 a request to provide an image with a name selected by the user, that is a visual avatar and an algorithmically one-way transformed data image of consumer's face, iris or fingerprint, that is a digital avatar to present the user in the system.

Digital avatars and visual avatars are stored in the payment application installed on the user device 1.

The NFC Dynamic Tag technology is used for establishing connection between the merchant's payment acceptance system and the user device 1. The NFC Reader/Writer Mode function allows reading NFC Tags generated by the "check in" computer 2 emulating a NFC Dynamic Tag. The user device 1 stores user payment data (a payment token or a payment card) and transmits the payment data to the merchant's payment acceptance system via the cloud computer server 8 to perform a payment transaction with pre-authorization of the user data in the loyalty platform 5 of the store.

An NFC Tag is a set of data that a digital device can communicate in a unicast way without the ability to read a response from the receiving device. The NFC Tag is generated by the "check in" computer 2 to identify the payment transaction, the sales point and the address of the merchant's server to be contacted to perform the payment transaction, and it is read by the user device 1, after which the "check in" computer 2 identifies the user by the password, the user face image or the iris image, the fingerprint, uses the payment token or the card stored in the user device 1 and sends the data to the cloud computer server 8 which sends the payment data to the merchant's payment acceptance system, which further allows the merchant to complete the payment transaction as with a usual payment card received directly from a user (a client).

According to one embodiment, before starting the transaction the display of the "check in" computer 2 shows all the visual avatars and names of the users who are in the close proximity to the payment transaction site, thus enabling a particular user to select his/her visual avatar from the suggested list at the payment transaction site and to start the transaction. Thereafter, the user being the buyer selects himself by the visual avatar, presses the touch screen where the visual avatar is located on the screen, after which the merchant payment system (the cash register 4, a payment terminal, etc.) communicates with the user device 1 through the cloud computer server 8 for obtaining the payment data (the payment token) from the user payment application and performing additional verification if necessary. If the user has been identified using face or iris recognition by the "check in" computer 2, only one visual avatar will be presented on the screen for consumer selection.

The user can identify himself/herself in many ways: by selecting his/her visual avatar from the list and confirming his/her avatar, by looking at the camera, by touching the biometric fingerprint reader, by touching with the phone provided with a NFC function. The "check in" computer 2 should be characterized by having a touch screen, a NFC Reader/Writer Mode, a function of scanning fingerprints, the ability to generate and broadcast (emit) Dynamic NFC Tag radio signal.

In one embodiment of the method as claimed, the user identification can be performed based on a user face image (a photo or video or combination of both). Directly at the payment transaction site, it is possible to provide a photo, a video image, a fingerprint, or other biometric data of the user on the "check in" computer 2 having a data transformation algorithm and send this data to the cloud computer server 8, which compares them with the similar data received from the device 1 using the same algorithm, and after comparing it can be concluded whether these images belong to the same user without compromising the confidentiality and identifying the user. In this case, the algorithm transforms the user face image or other user biometric data into a set of unique, impersonal digital data that are uniquely associated with the user, his/her device 1, payment application, and loyalty card numbers, and that cannot be transformed back to obtain the original biometric data to identify the user or using these data to commit unauthorized transactions.

Moreover, the application on the "check in" computer 2 contains an algorithm that allows transforming the user biometric data (for example, the user face image) into a unique set of data that cannot be transformed back into biometric data (for example, the user face image). This unique image is called a digital avatar.

The merchant device 6 sends a payment confirmation request to the user device 1 to initiate a transaction in the store, and receives the confirmation from the user device 1 to process the transaction in the store. The user device 1 transmits payment data (a payment token) to the merchant device 6 to perform the payment transaction. The merchant device 6 processes the payment data based on the confirmation received from the user device 1, wherein said operations are performed via the cloud computer server 8.

In addition, the payment token is transformed using a hash function (SHA-256) with adding unique data generated by the cloud computer server 8 based on the privacy key and the algorithm known only to the cloud computer server 8 to the hash along with the payment token, which makes it possible to create a unique identifier of the user device 1 uniquely matching the payment token but without the ability of transforming the received number back into the payment token. This function is necessary for obtaining a unique identifier that is uniquely associated with the user being the buyer and his/her device 1, payment application, and loyalty card numbers, and that can be stored in the database 9 without special security requirements since it cannot be transformed back into the payment token and used as a card to perform a payment. Even if the database 9 storing the hashed data is hacked, it will be impossible to obtain the payment token and, accordingly, it will be impossible to perform payment transactions with it. For example, the algorithm for obtaining the identifier can be as follows: SHA-256 (SHA-256 (Token+Secret)+Token), where Token is a payment token received from the user device 1, and Secret is unique data generated by the server based on a privacy key that is stored not in the database 9, but in the HSM (hardware security module).

All the participating devices, both of the user and of the merchant, are able to transmit the received data to the cloud computer server 8 directly or indirectly through another device (for example, the scanner 3 of product unique codes can communicate with the cloud computer server 8 not directly, but through the cash register 4, to which it is connected), which does not change the architecture of the solution or interaction between the solution objects.

Step 2—Starting the Payment Transaction Process.

At this step a process takes place that can be conditionally designated as "check in", that is, at this step the user confirms that he/she is ready to start a payment transaction process while being the next in the queue when the previous user is still completing the payment transaction process.

Steps 3 and 4—Scanning the Codes of the Goods Being Purchased and Performing Cash Transactions.

Immediately after the user has been identified using the "check in" computer 2 and the user device 1 or simultaneously with this, the operator of the cash register 4 scans the product codes using the scanner 3 of product unique codes. The product codes read by the scanner 3 of product unique codes directly or through the cash register 4 are sent to the cloud computer server 8 where they are associated with a particular user who has a payment application on the user device 1 or the user device 7 with a product or brand application. Then the cloud computer server 8 using this information will be able to send major purchase data (the amount, the list of products, discounts, bonuses, etc.) to the payment application on the user device 1 and the data on the particular purchased product in the user device 7 with a product or brand application, on the basis of which the store or the manufacturer will be able to make targeted (customer-oriented) offers for a particular user.

Step 5—Performing a Loyalty Operation.

During a loyalty operation, a user is given discounts and bonuses before the final purchase amount is calculated.

After all the products have been scanned by the scanner 3 of product unique codes and the price of each product has been determined, the cash register 4 sends a request to the cloud computer server 8 that stores the data on the user making the purchase, so that the cloud computer server 8, according to the user data (the payment token or the card, and/or the loyalty card number of the store associated with the given token), would determine the discounts available for the user or the bonuses added to his/her account. To this end, the cloud computer server 8 converts the existing payment token into a loyalty card number of the user in this store and sends a request to the loyalty platform 5 of the store or a third party managing the loyalty platform 5 of the store or a third party. The bonuses received are added to the user account, and the existing discounts are returned to the cash register 4, which changes the final amount of the transaction taking into account the discount, and starts the payment transaction process via the cloud computer server 8. It may be necessary to have several requests/responses between the cash register 4 and the loyalty platform 5 of the store or a third party through the cloud computer server 8 or directly, depending on the implementation of the solution.

Step 6—Completing the Payment Transaction Process.

The next step is to transmit the task of the payment transaction authorization to the "check out" computer 6 by means of the cash register 4 via the cloud computer server 8. Actually, the task is to transfer the payment amount from the cash register 4, and the payment token temporarily stored in the cloud computer server 8 onto the "check out" computer 6 completing the transaction by sending the payment data and the amount to the payment network and receiving authorization confirmation. The "check out" computer 6 shows the amount of the transaction on the display, and may also display a visual avatar of this user. The user can confirm the purchase amount by clicking his/her visual avatar, clicking the OK (confirm) button, nodding to the camera of the "check out" computer 6, putting a finger to the fingerprint reader, or simply confirming with a consent sign given to the cashier, which allows completing the transaction.

The payment token is used as an identifier of the user loyalty card in the store. This is achieved by the prior association of the payment token in the user device 1 with the loyalty card number of the store in the cloud computer server 8. Thus, the payment token in the user device 1 is used twice: first to make a request to the cloud computer server 8 when, in response to the request with the payment token, the user loyalty card number of this store is returned, by means of which the store can provided the user with discounts or add bonuses to his/her account, after that the payment token is used just for performing the payment transaction as with an ordinary payment card. This solution is applicable to such payment applications as Apple Pay, Google Pay, Samsung Pay and the like using NFC technology.

Step 7—Processing the Data on the Completed Purchase and Informing the User.

The final step includes processing the data on the completed purchase by the cloud computer server 8, that is, counting the goods purchased by a particular user and scanned by the scanner 3 of product unique codes, which allows segregating the data according to the user, the goods, and the store in which the product was purchased. This allows the cloud computer server 8 to send the purchase statistics to the device 7 with a product or brand application, which in turn allows the manufacturer of the product or brand to provide targeted offers for the goods purchased by the user who has installed the product or brand application. For example, if the user buys the same type of milk from the same manufacturer, he/she can install a product or brand application "my milk", and when buying a certain number of bottles, he/she can get a gift or an offer from the manufacturer of this milk through the product or brand application.

The collection of data on each purchased product is realized by reading the individual product code at the sales point with the subsequent determination of the person who purchased the goods. The system registers previous purchases of this product in the cloud computer server 8, and then sends the information about the purchased product to the product or brand application in the user device 1 associated with that particular product. The essence of the solution is that when a product code is scanned by the scanner 3 of product unique codes, this information is sent to the cloud computer server 8, which collects information from different stores where the user bought this product.

The aggregated information about the purchases of the product with special offers for this product is send to the user via e-mail, via the product or brand application, or via post. The user can receive a discount or add bonuses to his/her account using the loyalty card number. The payment token is associated in the user device 1 with the user loyalty card number in the store in the cloud computer server 8. The codes of the goods being purchased are scanned with the scanner 3 of product unique codes and sent to the cash register 4 where the total purchase amount is calculated; a request is sent to the loyalty platform 5 of the store or a third party for receiving discounts for the goods and calculating the bonuses, and then the final purchase amount is recalculated and the payment transaction is completed. At the final step of the payment transaction, the cash register 4 receives the payment data (a payment card or a payment token) from the cloud computer server 8 and sends the amount, the receipt number and the token (the card) to the "check out" computer 6.

The embodiments of the present invention are described in detail below.

Embodiment 1

The user activates the payment application on the user device 1 characterized by having a NFC Reader/Writer Mode function which allows reading the so-called NFC Tags generated by the "check in" computer 2 and containing the number of the cash register 4, the transaction ID (for example, a receipt number), and the server address of the store to be contacted for performing the transaction. The "check in" computer 2 also calculates a digital avatar of the user and sends it to the cloud computer server 8. At the same time, after reading the NFC Tag, the user device 1 communicates with the cloud computer server 8, transmits its digital avatar, and if it coincides with that received from the camera, it also transmits the payment token required for performing the payment and the loyalty operation. Optionally, the user's visual avatar can be shown on the display to confirm to the user the fact of the operation beginning, after which the user can confirm the beginning by clicking the avatar.

Embodiment 2

The user activates an X PAY payment application (such Apple Pay, Google Pay, Samsung Pay or the like) on the user device 1 through recognizing the user's face or the image of the iris, and checking the fingerprint.

The invention allows adding the following additional features to the existing payment X PAY solutions, such as Apple Pay, Google Pay, and Samsung Pay:

1. To register a payment token stored in the X PAY payment application in the database of the cloud computer server 8 in the form of a SHA-256 hash with the addition of unique data produced by the server based on the privacy key, and to use it to identify the user device 1 from which the payment transaction is performed.
2. When a payment transaction is performed through the NFC interface using X PAY, it is possible to transmit the data directly from the store (merchant) to the user payment application. This data may include cash and sales receipts, information about the goods purchased and the discounts received, offers from the store (merchant, product manufacture or brand) for the further purchases and so on.
3. It is possible to perform a payment transaction using biometric data, such as a user face image, an iris image, a fingerprint, by means of providing biometric data from the "check in" computer 2 to user device 1, which stores and verifies biometric data, via the cloud computer server 8.
4. It is possible to use the payment token X PAY as a loyalty identifier (a card) of a store (merchant) or a provider of the loyalty platform 5.

In this solution it is assumed that the payment token (the card) has been already registered in the X PAY payment application. The biometric data are also stored in the user device 1 and are loaded there when the user activates his/her device 1.

Thereafter, the user applies the phone with a NFC function to the "check in" computer 2 which reads the payment token through the NFC interface (a NFC Card Emulation Mode function is used), and it is checked in the cloud computer server 8 if the user is registered in the system, and then the user device 1 is communicated and the received visual avatar which the user can optionally click to confirm is displayed. The user has been already authenticated and his/her payment token with other data has been received, so the cloud computer server 8 can start performing a loyalty operation and a payment transaction with this device 1.

When an NFC operation is used with such digital X PAY wallets as Apple Pay, Google Pay or Samsung Pay, the payment token received from the user device 1 via the NFC interface is sent to the cloud computer server 8 encrypted with a public key (RSA or ECC) and decrypted with a private server key known only to the server.

Embodiment 3

The user is suggested to look into the camera of the "check in" computer 2 for displaying the user visual avatar and then the user is informed that the payment transaction process has been started. Alternatively, the user is allowed to place a finger on the sensor of the "check in" computer 2 until the visual avatar is displayed. This is performed as follows: all the user devices 1 which are in close proximity to the cash register 4 send digital avatars to the cloud computer server 8. When the user looks into the camera of the "check in" computer 2 near the cash register 4 or presses the sensor with his/her finger, the "check in" computer 2 reads the digital avatar of the user and sends it to the cloud computer server 8 where it is compared to other avatars from the user devices 1, such that the most matching one is chosen and further shown on the display. The user can optionally click the avatar to confirm the start of the payment transaction, after which the cloud computer server 8 communicates with the matching device 1 only and requests a payment token for the transaction.

Embodiment 4

The display of the "check in" computer 2 shows all the visual avatars received from the user devices 1 in close proximity to the cash register 4. These visual avatars are associated with the user devices 1 and the digital avatars in which they are stored. The user is suggested to select his/her visual avatar by tapping the display at the point where said visual avatar is displayed, after which the cloud computer server 8 communicates only with the selected user device 1, compares his/her digital avatar to that received from the camera of the "check in" computer 2, and if they adequately match each other, the cloud computer server 8 requests a payment token (or a card) from the payment application on the user device 1 to perform first a loyalty operation and to perform the payment transaction after that.

Thus a method for performing a contactless payment transaction is developed, wherein a near-field communication (NFC) technology and/or a remote access technology to a user device via a cloud computer server 8 ("hands free" or "touchless" operations) are used, thus ensuring the achievement of the technical result consisting in providing privacy and security while transmitting the image of a user face or other user biometric data, as well as in increasing the user convenience, and accelerating the process of payment transaction.

The invention claimed is:

1. A method for performing a contactless payment transaction, by at least one processor, the method comprising:
   determining, by the cloud computer server, a plurality of mobile devices located in close proximity to a payment transaction site in a store, based on a location data of each of the plurality of mobile devices:
   receiving, by the cloud computer server, from each of the plurality of the mobile devices, (i) a first unique data set, said first unique data set being obtained by algorithmic one-way transformation of a biometric data of a user of a respective mobile device by means of a data transformation algorithm, and (ii) a visual avatar data set in association with said first unique data set, said visual avatar data set comprising an image and/or name representing the user of the respective mobile device;
   providing, via a visual interface of a payment terminal located at the payment transaction site, a plurality of visual avatar data sets received from the plurality of mobile devices via the cloud computer server;
   receiving, via the visual interface of the payment terminal, a user selection of a specific visual avatar data set of the plurality of visual avatar data sets, and sending the user selection to the cloud computer server;
   scanning, by the payment terminate, a biometric data of a specific user;
   transforming, by the payment terminal, the scanned biometric data into a second unique data set by means of the data transformation algorithm and sending the second unique data set to the cloud computer server;
   comparing, by the cloud computer server, the first unique data set associated with the specific visual avatar data set corresponding to the user selection and the second unique data set, and when the first unique data set matches the second unique data set, requesting, by the cloud computer server, a payment token or a payment card information from a mobile device, from which the first unique data set associated with the specific visual avatar data set was received; and
   sending the payment token or payment card information via the cloud computer server to a payment network, to complete the payment transaction.

2. The method of claim 1, characterized in that the biometric data are a face image, and/or an iris image, and/or a fingerprint of the user and scanning of the biometric data is performed by means of a camera and/or a fingerprint reader of the payment terminal.

3. The method of claim 1, characterized in that it includes an advance registration of the specific user, including uploading, to the server, the specific visual avatar data set.

4. The method of claim 1, characterized in that it includes further informing of the specific user about the start of the payment transaction, the completion of the payment transaction and the processing of the data on the completed purchase, wherein the informing of the specific user is carried out through a cloud computer server.

5. The method of claim 1, characterized in that the data transformation algorithm comprises adding data generated by the cloud computer server based on a secret key to the biometric data of the user of the respective mobile device or to the biometric data of the specific user, respectively, and applying a hash function thereto.

* * * * *